(12) United States Patent
Cherusseri et al.

(10) Patent No.: US 9,514,426 B2
(45) Date of Patent: Dec. 6, 2016

(54) SYSTEM AND METHOD FOR PROVIDING ENTERPRISE INFORMATION TECHNOLOGY LIFECYCLE TOOLS SYNCHRONIZATION PLATFORM

(71) Applicants: Suresh Cherusseri, Maharashtra (IN); Satya Narayan Mishra, Orissa (IN)

(72) Inventors: Suresh Cherusseri, Maharashtra (IN); Satya Narayan Mishra, Orissa (IN)

(73) Assignee: Tata Consultancy Services Limited, Maharashtra (IN)

( * ) Notice: Subject to any disclaimer, the term of this patent is extended or adjusted under 35 U.S.C. 154(b) by 534 days.

(21) Appl. No.: 13/752,984

(22) Filed: Jan. 29, 2013

(65) Prior Publication Data

US 2013/0211569 A1   Aug. 15, 2013

(30) Foreign Application Priority Data

Feb. 14, 2012 (IN) .......................... 407/MUM/2012

(51) Int. Cl.
  *G05B 15/02* (2006.01)
  *G06Q 10/06* (2012.01)
  *G06F 17/00* (2006.01)

(52) U.S. Cl.
  CPC ............... *G06Q 10/06* (2013.01); *G06F 17/00* (2013.01)

(58) Field of Classification Search
  None
  See application file for complete search history.

(56) References Cited

U.S. PATENT DOCUMENTS

| 2002/0107947 | A1  | 8/2002 | Moragne et al. |
| 2005/0216421 | A1* | 9/2005 | Barry et al. ............... 705/64 |
| 2009/0132308 | A1  | 5/2009 | Randolph et al. |

FOREIGN PATENT DOCUMENTS

CN          101394420          3/2009

OTHER PUBLICATIONS

IBM "Jazz Integration Architecture Overview".
IBM "Using a Model-Driven Transformational Approach and Service-Oriented Architecture for Service Delivery Management".
University of the Aegean, Greece "Agile Product Lifecycle Management for Service Delivery Frameworks".

* cited by examiner

*Primary Examiner* — Sean Shechtman
(74) *Attorney, Agent, or Firm* — Hayes Soloway P.C.

(57) ABSTRACT

The present invention relates to a system and method for integrating and assembling plurality of service delivery tools created on disparate technologies on a product assembly platform. Further, the invention provides a reference architecture and method for orchestrating the assembled plurality of service delivery tools and monitoring the lifecycle activities of the plurality of service delivery tools.

11 Claims, 2 Drawing Sheets

SYSTEM AND METHOD FOR PROVIDING ENTERPRISE INFORMATION TECHNOLOGY LIFECYCLE TOOLS SYNCHRONIZATION PLATFORM

FIELD OF THE INVENTION

The invention relates to the field of service delivery in information technology. More particularly the present invention relates to a system and method for assembling plurality of service delivery tools on a product assembly platform.

BACKGROUND OF THE INVENTION

The information technology (IT) service delivery lifecycle describes various progressive stages of a particular IT service from planning, aligning, designing and delivering the said IT service according to a business process or a business strategy. The service delivery lifecycle process is executed in different phases. Each phase of the IT service delivery lifecycle provides service management functions. There are number of standalone software tools or service delivery tools for ensuring errorless service delivery. Different software tools of disparate technologies are used during different phases of the service delivery lifecycle.

Presently, the service delivery is being facilitated by such multiple software tools of disparate technologies resulting into restricted silos during the service deliveries lifecycle. Thus, an interaction for the users across these silos becomes cumbersome with minimum capability of orchestration and monitoring of a particular activity in the service delivery lifecycle.

Hence, there is a lack of orchestration and monitoring of the multiple stand alone software tools, especially when the said stand alone software tools are created on disparate technologies. Moreover, yet another issue related to the service delivery in information technology is of assembling and integration of these stand alone software tools on a common platform, which is still an unaddressed problem in the art. Hence, there is a long felt need for a system and method for providing a common product assembly platform for assembling, orchestrating and monitoring a plurality of standalone software tools and further facilitating a composite view of the said plurality of standalone software tools for user interaction through a user interface.

OBJECTS OF THE INVENTION

The primary objective of a present invention is to provide a system and method enabling registration, integration and assembling of plurality of service delivery tools created on disparate technologies on a product assembly platform.

Another object of the present invention is to provide the system and method for orchestrating the plurality of service delivery tools and providing a composite user interface for user interaction.

Yet another object of the present invention is to provide the system and method for monitoring the lifecycle activities of the plurality of service delivery tool.

SUMMARY OF THE INVENTION

Before the present system and method, enablement are described, it is to be understood that this invention is not limited to the particular system, and methodologies described, as there can be multiple possible embodiments which are not expressly illustrated in the present disclosure. It is also to be understood that the terminology used in the description is for the purpose of describing the particular versions or embodiments only, and is not intended to limit the scope of the present invention.

The present invention introduces a system and method for registration, integration and assembling plurality of service delivery tools created on disparate or similar technologies on a product assembly platform. The said product assembly platform enables orchestration among the plurality of service delivery tools and provides a composite user interface for assembling and displaying the plurality of service delivery tools created on disparate technologies or similar technologies to a user.

In one aspect of the present invention a system is provided for integration and assembling of plurality of service delivery tools on the product assembly platform, the system comprises: a processor; a memory coupled to the processor, wherein the memory stores the product assembly platform capable of being executed by the processor, the product assembly platform further comprises: a service registry module is configured to register the plurality of services delivery tools and plurality of events associated with the plurality of service delivery tools, the service registry is further configured to store registration information and the plurality of events associated with the plurality of service delivery tools, wherein each service delivery tool of the plurality of service delivery tool is based on the disparate technologies and similar technologies; an information gateway is configured to facilitate information exchange between plurality of service delivery tools, a process orchestration engine and a composite service user interface (UI) module; a composite service user interface (UI) module is configured to display the plurality of service delivery tools to the user, wherein the composite service user interface (UI) module assemble and integrate the plurality of service delivery tools on the product assembly platform; and a process orchestration engine, communicatively coupled with the information gateway, wherein the process orchestration engine is configured to orchestrate and monitor lifecycle activities of a plurality of service delivery tools over the product assembly platform based on the registration details of the plurality of software products.

In an another aspect of the present invention a method is considered for providing an architecture of the product assembly platform for assembling, integrating and monitoring the plurality of service delivery tools created on disparate or similar technologies on the product assembly platform, wherein the method comprises of: registering the plurality of the service delivery tools and events associated with the plurality of service delivery tools to a service registry by providing registration information and events associated with the plurality of service delivery tools, wherein each service delivery tool of the plurality of service delivery tools is based upon one of the disparate technologies and similar technologies; facilitating an information exchange between the plurality of service delivery tools, the composite service user interface (UI) module, and the process orchestration engine; displaying the plurality of service delivery tools to the user in a composite user interface mode by the composite service user interface (UI) module; and orchestrating and monitoring the lifecycle activities of the plurality of service delivery tools.

Thus the system and method is provided for registering, integrating and assembling the plurality of service delivery tools which are created on disparate or similar technologies on the product assembly platform. Further, the product assembly platform is also configured for orchestrating the assembled, the plurality of service delivery tools enabling the user to monitor the lifecycle activities of the plurality of service delivery tools.

BRIEF DESCRIPTION OF THE DRAWINGS

The foregoing summary, as well as the following detailed description of preferred embodiments, is better understood when read in conjunction with the appended drawings.

For the purpose of illustrating the invention, there is shown in the drawings various stages of the invention; however, the invention is not limited to the specific system components and methods disclosed in the drawings.

DETAILED DESCRIPTION OF THE INVENTION

Figure 1:
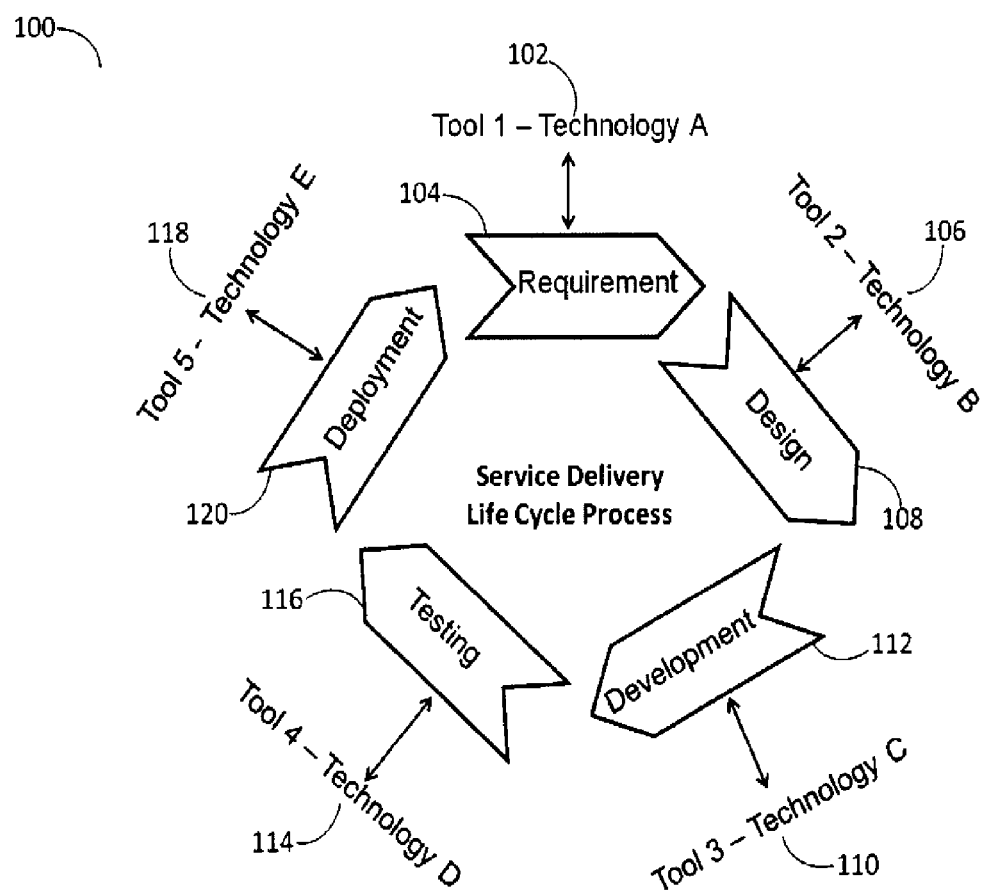
FIG. 1 is the illustration of a service delivery lifecycle process (100) using plurality of service delivery tools created on disparate or similar technologies according to one aspect of the present invention.

The invention will now be described with respect to various embodiments. The following description provides specific details for understanding of, and enabling description for, these embodiments of the invention. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It should be noted that the "service delivery tool" represents a software product and can be a software application, a software service or a software tool.

The invention generally provides a system and method for registering, integrating and assembling a plurality of service delivery tools which are created on disparate or similar technologies upon a product assembly platform. Further, the product assembly platform is stored in a memory of the system, said product assembly platform is configured to orchestrate the plurality of service delivery tools enabling the user to monitor the lifecycle activities of the plurality of service delivery tools.

In an embodiment of the invention the system comprises a processor, the memory coupled to the processor, wherein the memory stored the product assembly platform, said product assembly platform comprises a service registry module, an information gateway, the composite service user interface (UI) module and the process orchestration engine: The service registry module configured to register the plurality of service delivery tools and a plurality of events associated with the plurality of service delivery tools. The service registry is also configured to store registration information and the plurality of events associated with the plurality of service delivery tools, wherein each software product of the plurality of service delivery tools is based upon one of disparate technologies and similar technologies. The registration information comprises at least one of a communication protocol, an information exchange format, a mode of exchange of information, a frequency of exchange of information, and a combination thereof. The disparate technology upon which the plurality of service delivery tools is based comprises Java, Microsoft.Net, Extjs, Ruby on rails, AJAX and combination thereof.

The information gateway communicatively coupled with a service registry having the plurality of service delivery tools registered therewith, the process orchestration engine, the composite user interface (UI) module. The information gateway is configured to facilitate an information exchange between the plurality of service delivery tools, a composite service user interface (UI) module, and a process orchestration engine. The information gateway is further configured to provide protocols for communication with the plurality of service delivery tools that are registered with the service registry. While subscribing the plurality of service delivery tools from the service registry, the information gateway is adapted to establish a communication between the registered the plurality of service delivery tools which are registered with the external service delivery tools created on disparate technologies upon the product assembly platform.

The service delivery tools are adapted to be registered in the information gateway via the service registry using a composite user interface. While registering the plurality of service delivery tools, the registration information such as a communication protocols, information exchange format, mode of exchange, data formats, frequency of communication and the details on domain content are shared with the information gateway. In the information gateway, an administrator is adapted to approve each registered service delivery tool and upon approval, the metadata associated with each such service delivery tool is stored in a data store. The metadata information of the registered the plurality of service delivery tools is available for other modules in the product assembly platform.

Further, the information gateway is adapted for facilitating an information exchange through files and it monitors each transaction between each of the plurality of service delivery tools. The translation of information required will be provided by the information gateway through standard set of adopters. The information gateway ensures that the information exchange between the product assembly platform and the plurality of service delivery tools are carried out in a secure fashion using standard security techniques like encryption and secure messaging.

After the registration of the plurality of service delivery tools, the composite service user interface (UI) module of the present invention is configured to display the plurality of service delivery tools to a user, wherein the composite service (UI) module is further configured to assemble and integrate the plurality of service delivery tools on the product assembly platform. In an exemplary embodiment of the invention, the composite service user interface (UI) module further enables the user to monitor life cycle activities across the plurality of service delivery tools by bringing the plurality of service delivery tools onto a common User Interface.

In an another exemplary embodiment of the invention, the composite service user interface (UI) module is also configured to facilitate an authenticated access to a number of widgets associated with the plurality of service delivery tools, the authenticated access is adapted to be context sensitive and monitor the activities in the corresponding widgets. In another exemplary embodiment of the invention, composite services user interface (UI) module is configured to interact with a plurality of service delivery tools through the information gateway in the context aware mode and further adapted for a role based secure authenticated access to the product assembly platform. The plurality of widgets forms a composite user interface for securely accessing the plurality of service delivery tools subscribed, each of the plurality of widget is adapted to monitor corresponding processes across the lifecycle activities of the service delivery tools while creating and maintaining users, user roles and organizations for the plurality of service delivery tools.

In another exemplary embodiment of the invention, composite services user interface (UI) module, for each change occurs in the context of at least one widget is further adapted to reflect corresponding changes into other associated widgets which are a part of the lifecycle activities of the service delivery tools.

The process orchestration engine communicatively coupled to the information gateway, wherein the process orchestration engine is configured to orchestrate and monitor lifecycle activities of the plurality of service delivery tools over the product assembly platform based on the registration details of the plurality of service delivery tools.

A process orchestration engine of the present invention is further adapted to use registration information of the plurality of service delivery tools for facilitating the information exchange between two transacting service delivery tools. The process orchestration engine is further configured for defining and storing lifecycle activities of the plurality of service delivery tools across service delivery life cycle, identifying key performance indicators, milestones for the service delivery life cycle. The process orchestration engine is further configured to handle both human and system interactions with various service delivery tools registered in the service registry.

In an exemplary embodiment of the invention, the process orchestration engine of the present invention further handles both human centric workflow as well as straight through process flows during orchestration and monitoring lifecycle activities of the plurality of service delivery tools.

In another exemplary embodiment of the invention, the process orchestration engine accesses the service registry and picks up the events that are needed to orchestrate between the service delivery tools or the events which require information flow between one or more service delivery tools. These events are orchestrated as per the life cycle process definitions which can be carried out through a composite user interface unit. These process definitions along with the key process indicator for each process steps are stored in a data store and retrieved when the step is initiated by the action of one of the service delivery tools or users. The process orchestration engine also maintains the information about both short running and long running processes in the service delivery lifecycle and maintains the turnaround time required for each process occurring during the lifecycle activities of the plurality of service delivery tool. Further, the process orchestration engine interacts with the composite service user interface (UI) module whenever an activity requires human interaction to move to the next step.

The product assembly platform is further configured to offer a plurality of value added service across multiple products or platforms like collaboration, KM, security, alerts, notifications. These services are loosely coupled and can be subscribed by various service delivery tools and products and created on standard service definition pattern enabling access through multiple standard protocols.

Next, the preferred embodiments of the present invention will be described below based on drawings.

FIG. 1 is the illustration of a service delivery lifecycle process (100) using multiple service delivery tools created on disparate technologies to one aspect of the present invention. In an embodiment of the present invention the service delivery lifecycle process executes in different phases such as Requirement phase (104), Design phase (108), Development phase (112), Testing phase (116) and Deployment phase (120) and each of these phases requires different service delivery tools.

For a successful implementation of a business process or a business strategy the phases for the service delivery lifecycle is defined for which the plurality for service delivery tools are needed. In the present case, Tool-1 created on Technology A (102) is required by the Requirement phase (104), Tool-2 created on Technology B (106) is required by the Design phase (108), Tool-3 created on Technology C (110) is required by the Development phase (112), Tool-4 created on Technology D (114) is required by the Testing phase (116) and Tool-5 created on Technology E (118) is required by the Deployment phase (120).

The present invention provides a system and method for integrating and assembling the plurality of service delivery tools which are created on disparate technologies upon a product assembly platform. Further the product assembly platform is also configured for orchestrating the plurality of service delivery tools enabling the user to monitor the lifecycle activities of the plurality of service delivery tools.

Each of the plurality of service delivery tools which are created on disparate technologies is adapted to be registered using a user interface. During the registration process, each of the service delivery tools provides a predefined registration information such as communication protocols, information exchange format, mode of exchange, data formats, frequency of communication and the details on domain content. The registration information is further shared for establishing communication among the plurality of service delivery tools and for orchestrating the service delivery tools on the product assembly platform. Thus, the service delivery tools play an important role for executing the service delivery lifecycle process successfully.

Figure 2:
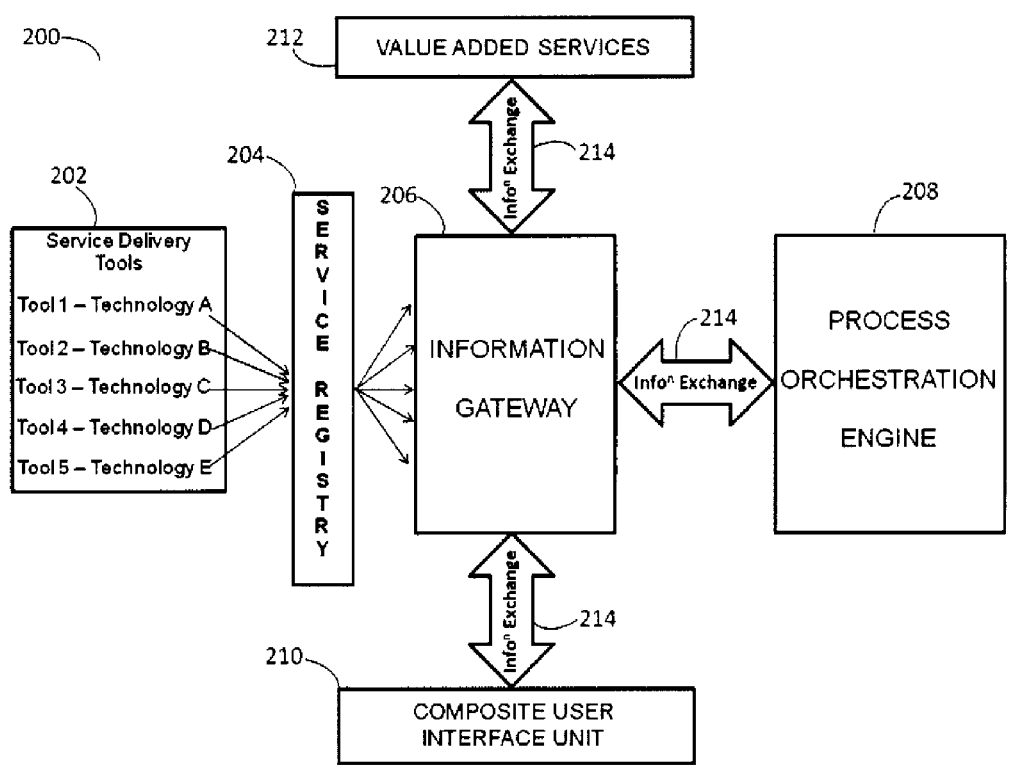
FIG. 2 is the architecture diagram (200) of the product assembly platform illustrating the multiple embodiments of the present invention.

FIG. 2 is the architecture diagram (200) of the product assembly platform illustrating the multiple embodiments of the present invention. The product assembly platform comprises of an information gateway (206) communicatively coupled with a service registry (204), a process orchestration engine (208), a composite user interface unit (210) i.e., a composite service user interface (UI) module and a value added services (212).

In an exemplary embodiment of the present invention the service registry (204) is configured for registering the plurality of service delivery tools (202) which are created on disparate technologies. The information gateway (206) is further configured for providing registration information for communication with the plurality of service delivery tools (202) which are registered to the service registry (204). During the subscription of the plurality of service delivery tools (202) through the service registry (204), the information gateway (206) is adapted to translate communication between the service delivery tools which are registered with the external service delivery tools created on disparate technologies upon the product assembly platform.

The service registry (204) is adapted to register the plurality of service delivery tools (202) using a user interface. During the registration of the service delivery tools (202), the registration information such as communication protocols, information exchange format, mode of exchange data formats, frequency of communication and the details of the domain content are shared with the information gateway (206). An administrator in the information gateway (206) is configured for approving the registration of the plurality of service delivery tools (202) upon which the metadata associated with each such registered service delivery tool is stored in a data store (not shown in the figure). The metadata information of the registered service delivery tools is available for other components in the product assembly platform.

Further, the information gateway (206) is adapted for facilitating an information exchange (214) through files and monitors each transaction between each communicating service delivery tools (202). The translation of information required is provided by the information gateway (206) through the standard set of adopters. The information gateway (206) ensures that the information exchange (214) between the product assembly platform and the plurality of service delivery tools are carried out in a secure fashion using standard security techniques like encryption and secure messaging.

A process orchestration engine (208) of the present invention is configured for using the registration information of the registered service delivery tools for facilitating the information exchange (214) between two transacting service delivery tools (202). The process orchestration engine (208) is further configured for defining and storing life cycle processes across service delivery life cycle, identifying key performance indicators, milestones for the service delivery life cycle processes and facilitating human and system interactions with various service delivery tools (202) registered in the lifecycle.

The process orchestration engine (208) of the present invention further handles both human centric workflow as well as straight through process flows. It accesses the service registry (204) and picks up the events that are needed to be orchestrated between the service delivery tools (202) or the events which require information flow between each of the one or more service delivery tools (202).

These events are orchestrated as per the life cycle process definitions which can be carried out through a composite user interface unit (210). These process definitions along with the key process indicator for each process steps are stored in a data store and retrieved when the step is initiated by the action of one of the service delivery tools (202) or users. The process orchestration engine (208) also maintains the information about both short running and long running processes in the service delivery lifecycle and maintains the turnaround time required for each key steps. Further, the process orchestration engine (208) interacts with the composite user interface units (210) whenever an activity requires human interaction to move to the next step.

The product assembly platform is further configured to offer a plurality of value added service (212) across multiple products or platforms like collaboration, KM, security, alerts, notifications. These services are loosely coupled and can be subscribed by various service delivery tools and products and created on standard service definition pattern enabling access through multiple standard protocols.

Thus the system and method is provided for registering, integrating and assembling plurality of service delivery tools which are created on disparate technologies upon a product assembly platform. Further the product assembly platform is also configured orchestrating the plurality of service delivery tools enabling the user to monitor the lifecycle activities of the plurality of service delivery tools.

In accordance with various embodiments of the present disclosure, the methods described herein are intended for operation as software programs running on a computer processor.

The illustrations of arrangements described herein are intended to provide a general understanding of the structure of various embodiments, and they are not intended to serve as a complete description of all the elements and features of methods and system that might make use of the structures described herein.

Although the invention has been described in terms of specific embodiments and applications, persons skilled in the art can, in light of this teaching, generate additional embodiments without exceeding the scope or departing from the spirit of the invention described herein.

We claim:

1. A system for integrating a plurality of service delivery tools on a product assembly platform, the system comprises of:
   a processor;
   a memory coupled to the processor, wherein the memory stores the product assembly platform capable of being executed by the processor, the product assembly platform comprises:
   a service registry module configured to
      register the plurality of service delivery tools and a plurality of events associated with the plurality of service delivery tools to a service registry; and
      store registration information and the plurality of events associated with the plurality of service delivery tools, wherein each service delivery tool of the plurality of service delivery tools is based upon at least one of disparate technologies and similar technologies;
   an information gateway configured to facilitate an information exchange between the plurality of service delivery tools based on the registration information in the service registry;
   a composite service user interface (UI) module configured to display the plurality of service delivery tools to a user, wherein the composite service (UI) module is further configured to assemble and integrate the plurality of service delivery tools on the product assembly platform; and
   a process orchestration engine communicatively coupled to the information gateway, wherein the process orchestration engine is configured to:
   define life cycle activities of the plurality of service delivery tools across a service delivery lifecycle based on key performance indicators and milestones for the service delivery lifecycle; and
   orchestrate the plurality of events associated with the plurality of service delivery tools based on the key performance indicators for a process step of the plurality of process steps and thereby monitor the lifecycle activities of the plurality of service delivery tools over the product assembly platform based on the registration information of the plurality of service delivery tools.

2. The system of claim 1, wherein the registration information comprises a communication protocol, an information exchange format, a mode of exchange of information, a frequency of the exchange of information, and a combination thereof.

3. The system of claim 1, wherein the plurality of service delivery tools comprises are least one of software applications and software products.

4. The system of claim 1, wherein the composite service user interface module is configured to display the plurality of service delivery tools and further enables the user to monitor the life cycle activities across the plurality of service delivery tools by bringing the plurality of service delivery tools onto a common User Interface.

5. The system of claim 1, wherein the process orchestration engine is further adapted to:
   select the plurality of events from the service registry requiring information flow between each service delivery tool of the plurality of service delivery tools.

6. The system of claim 1, wherein the process orchestration engine is further adapted to maintain and store characteristics and turnaround time for each process step occurring during the lifecycle activities of the plurality of service delivery tools.

7. The system of claim 1, wherein the composite services user interface (UI) module is configured to facilitate an authenticated access to a plurality of widgets associated with the plurality of service delivery tools, the authenticated access is adapted to be context sensitive and monitor the lifecycle activities corresponding to the plurality of widgets.

8. The system of claim 1, wherein the composite services user interface (UI) module is configured to interact with the plurality of service delivery tools through the information gateway in a context aware mode and further adapted for a role based secure authenticated access to the product assembly platform.

9. The system of claim 7, wherein the plurality of widgets forms a composite user interface for securely accessing the plurality of service delivery tools subscribed, each of the plurality of widget is adapted to monitor corresponding processes across the lifecycle activities of the service delivery tools while creating and maintaining users, user roles and organizations for the plurality of service delivery tools.

10. The system of claim 1, wherein the process orchestration engine is further configured to concurrently handle both human centric workflow and straight through process flows during orchestration and monitoring lifecycle activities of the plurality of service delivery tools.

11. A method for assembling a plurality of service delivery tools on a product assembly platform, the method comprises of:
   registering the plurality of service delivery tools and a plurality of events associated with the plurality of service delivery tools to a service registry storing registration information and the plurality of events associated with the plurality of service delivery tools, wherein each service delivery tool of the plurality of service delivery tools is based upon at least one of disparate technologies and similar technologies;
   facilitating an information exchange between the plurality of service delivery tools based on the registration information in the service registry;
   displaying the plurality of service delivery tools to a user in a composite user interface mode by the composite service user interface (UI) module; and
   defining life cycle activities of the plurality of service delivery tools across a service delivery lifecycle based on key performance indicators and milestones for the service delivery lifecycle; and
   orchestrating the plurality of events associated with the plurality of service delivery tools based on the key performance indicators for a process step of the plurality of process steps and thereby monitor lifecycle activities of the plurality of service delivery tools over the product assembly platform based on the registration information of the plurality of service delivery tools.

* * * * *

UNITED STATES PATENT AND TRADEMARK OFFICE
CERTIFICATE OF CORRECTION

PATENT NO. : 9,514,426 B2
APPLICATION NO. : 13/752984
DATED : December 6, 2016
INVENTOR(S) : Cherusseri et al.

Page 1 of 1

It is certified that error appears in the above-identified patent and that said Letters Patent is hereby corrected as shown below:

In the Claims

Column 8, Line 60, Claim 3, "are" should be --at--.

Signed and Sealed this
Thirtieth Day of April, 2019

Andrei Iancu
*Director of the United States Patent and Trademark Office*